(12) United States Patent
Takahashi et al.

(10) Patent No.: US 11,367,463 B2
(45) Date of Patent: *Jun. 21, 2022

(54) REVERSIBLE RECORDING MEDIUM

(71) Applicant: Sony Corporation, Tokyo (JP)

(72) Inventors: Isao Takahashi, Kanagawa (JP); Satoko Asaoka, Kanagawa (JP); Taichi Takeuchi, Kanagawa (JP); Asuka Tejima, Kanagawa (JP); Kentaro Kuriyama, Kanagawa (JP); Mitsunari Hoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,409

(22) Filed: Jan. 29, 2021

(65) Prior Publication Data

US 2021/0151080 A1  May 20, 2021

Related U.S. Application Data

(63) Continuation of application No. 16/623,904, filed as application No. PCT/JP2018/018348 on May 11, 2018, now Pat. No. 10,910,010.

(30) Foreign Application Priority Data

Jun. 20, 2017  (JP) .............................. JP2017-120738

(51) Int. Cl.
 *G11B 7/256* (2006.01)
 *B41M 5/42* (2006.01)

(52) U.S. Cl.
 CPC ............... *G11B 7/256* (2013.01); *B41M 5/42* (2013.01); *B41M 2205/04* (2013.01); *B41M 2205/38* (2013.01); *B41M 2205/40* (2013.01)

(58) Field of Classification Search
 CPC ........... G11B 7/00455; B41M 2205/04; B41M 2205/18; B41M 2205/38; B41M 2205/40
 See application file for complete search history.

(56) References Cited

U.S. PATENT DOCUMENTS

| | | | |
|---|---|---|---|
| 2004/0185384 | A1 | 9/2004 | Suganuma et al. |
| 2005/0225891 | A1 | 10/2005 | Tsuboi et al. |

(Continued)

FOREIGN PATENT DOCUMENTS

| | | |
|---|---|---|
| JP | H09-020078 A | 1/1997 |
| JP | 2001-353965 A | 12/2001 |

(Continued)

OTHER PUBLICATIONS

International Search Report for Application No. PCT/JP2018/018348, dated Jul. 24, 2018.

*Primary Examiner* — Elizabeth E Mulvaney
(74) *Attorney, Agent, or Firm* — K&L Gates LLP

(57) ABSTRACT

A reversible recording medium according to an embodiment of the present disclosure is a reversible recording medium that includes recording layers and heat-insulating layers that are alternately stacked, in which the recording layers each include a reversible heat-sensitive color developing composition and a first light-heat converting agent. In this reversible recording medium, the recording layers are different from each other in a developing color of their respective reversible heat-sensitive color developing compositions and are different from each other in an absorption wavelength of their respective first light-heat converting agents. This reversible recording medium further includes a heat-generating layer that includes a second light-heat converting agent having an absorption wavelength that is different from the absorption wavelength of the first light-heat converting agent included in each of the recording layers.

10 Claims, 7 Drawing Sheets

(56) References Cited

U.S. PATENT DOCUMENTS

2006/0276335 A1  12/2006  Tsuboi et al.
2019/0270290 A1   9/2019  Kurihara et al.

FOREIGN PATENT DOCUMENTS

| JP | 2004-322423 A | 11/2004 |
| JP | 2005-066936 A | 3/2005 |
| JP | 2005-144953 A | 6/2005 |
| JP | 2005-205882 A | 8/2005 |
| JP | 2005-288977 A | 10/2005 |
| JP | 2007-098735 A | 4/2007 |
| JP | 2011-104995 A | 6/2011 |

[ FIG. 1 ]
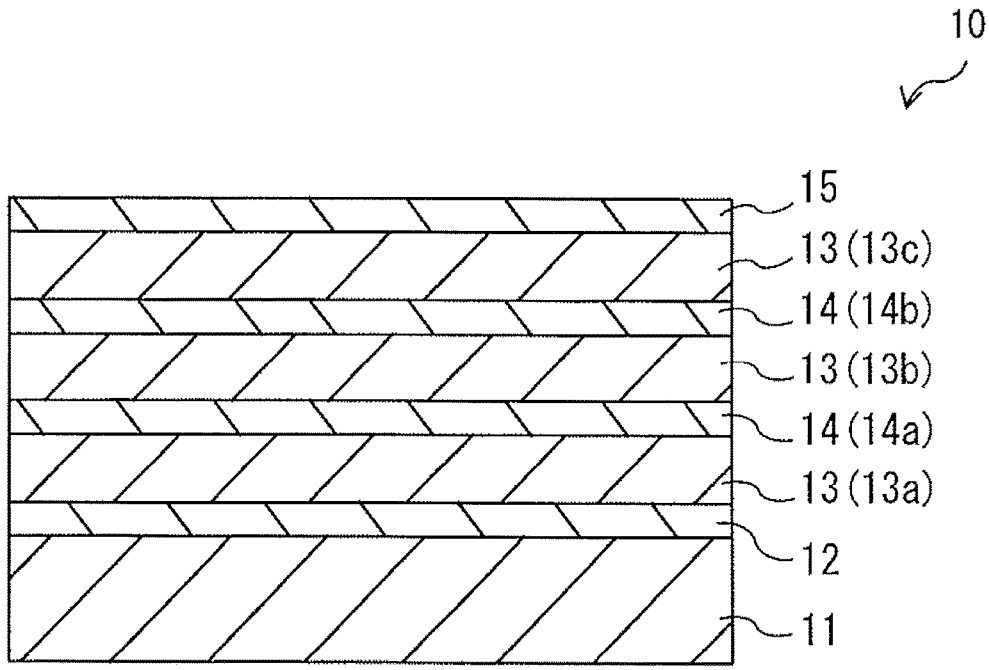
[ FIG. 2 ]
|  | LEUCO DYE 10A | LIGHT-HEAT CONVERTING AGENT 10B FOR WRITING | LIGHT-HEAT CONVERTING AGENT 10C FOR ERASING |
|---|---|---|---|
| PROTECTIVE LAYER 15 | — | — | ○ |
| RECORDING LAYER 13 (13c) | ○ | ○ | — |
| HEAT-INSULATING LAYER 14 (14b) | — | — | — |
| RECORDING LAYER 13 (13b) | ○ | ○ | — |
| HEAT-INSULATING LAYER 14 (14a) | — | — | — |
| RECORDING LAYER 13 (13a) | ○ | ○ | — |
| UNDERLAYER 12 | — | — | — |
| BASE MATERIAL 11 | — | — | — |

[FIG. 3]
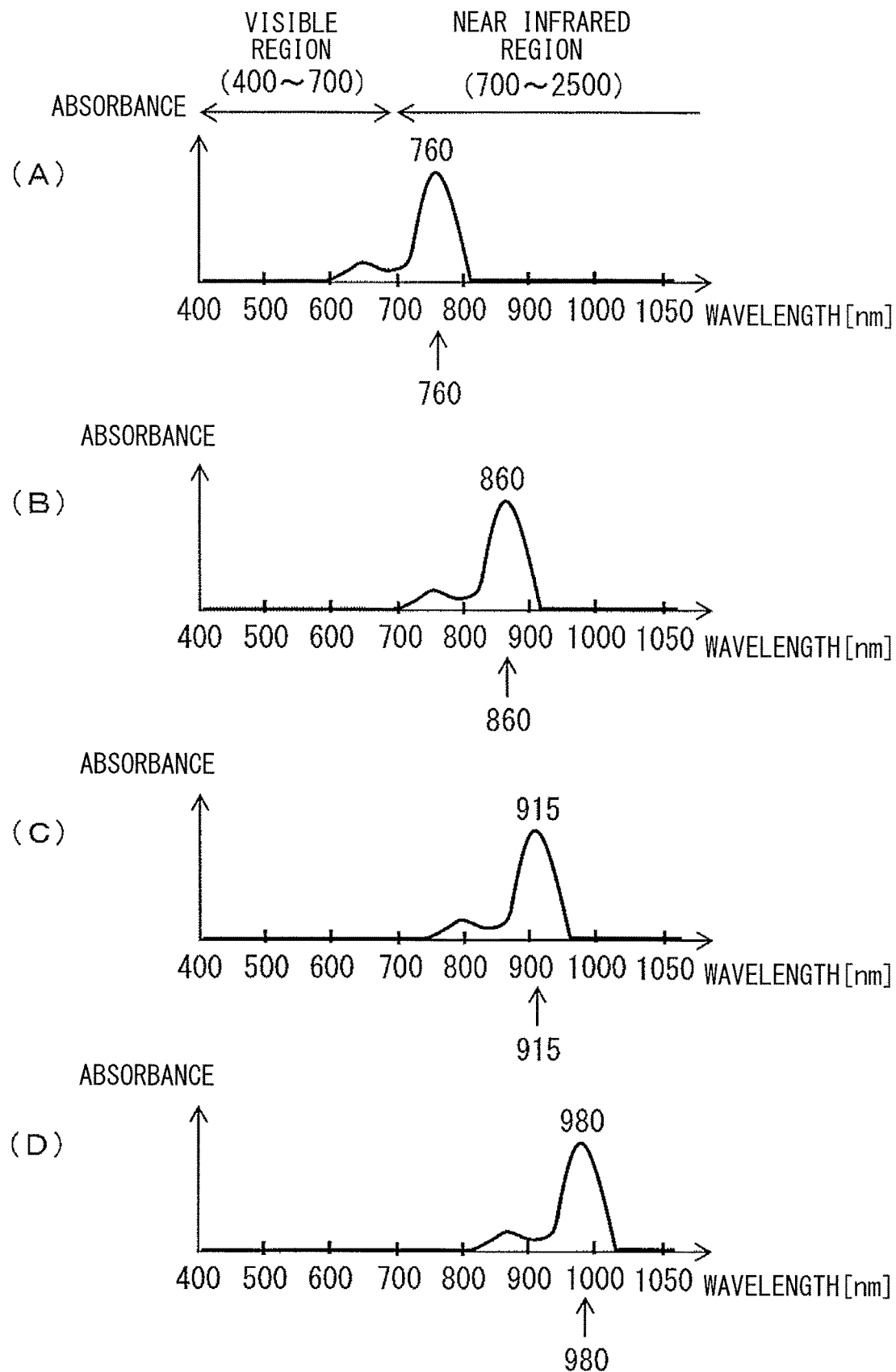

[ FIG. 4 ]
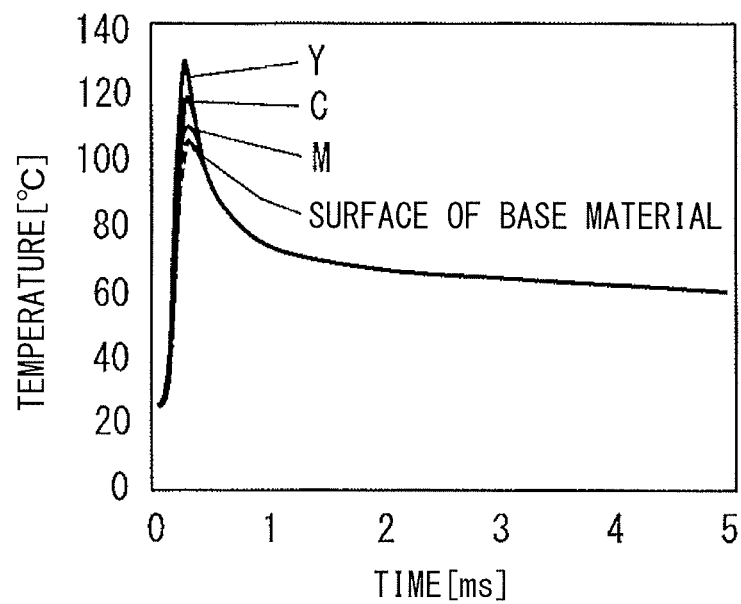
[ FIG. 5 ]
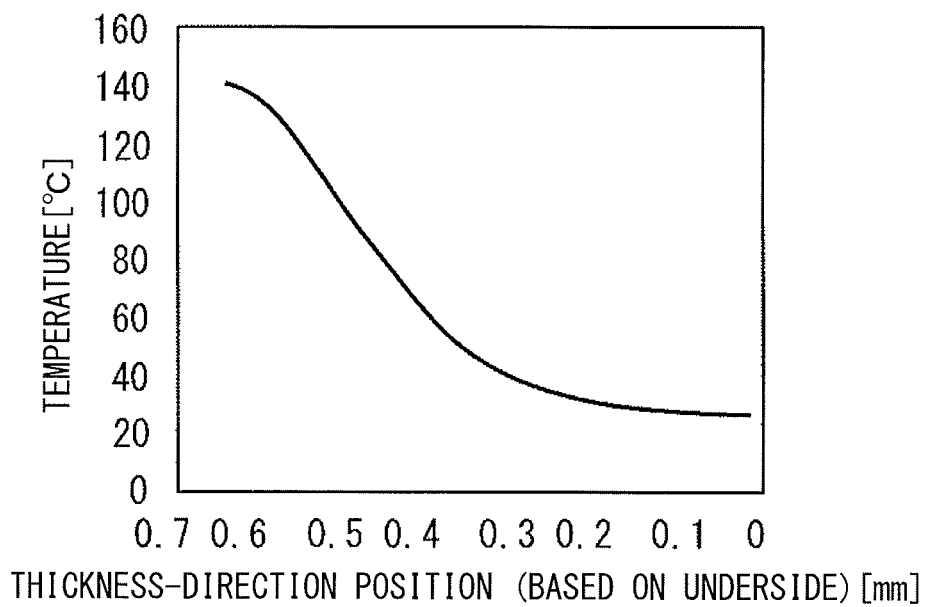

[ FIG. 6 ]
| | LEUCO DYE 10A | LIGHT-HEAT CONVERTING AGENT 10B FOR WRITING | LIGHT-HEAT CONVERTING AGENT 10C FOR ERASING |
|---|---|---|---|
| PROTECTIVE LAYER 15 | — | — | — |
| RECORDING LAYER 13 (13c) | ○ | ○ | — |
| HEAT-INSULATING LAYER 14 (14b) | — | — | — |
| RECORDING LAYER 13 (13b) | ○ | ○ | — |
| HEAT-INSULATING LAYER 14 (14a) | — | — | ○ |
| RECORDING LAYER 13 (13a) | ○ | ○ | — |
| UNDERLAYER 12 | — | — | — |
| BASE MATERIAL 11 | — | — | — |
[ FIG. 7 ]
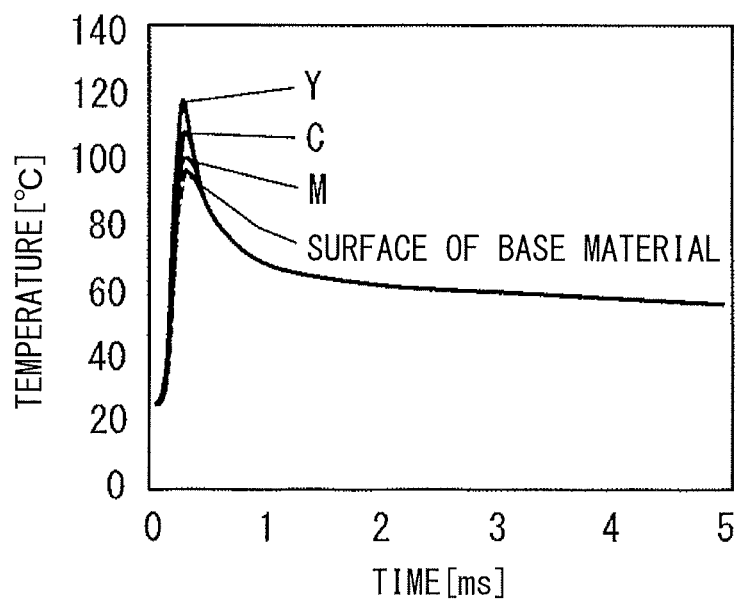

[ FIG. 8 ]
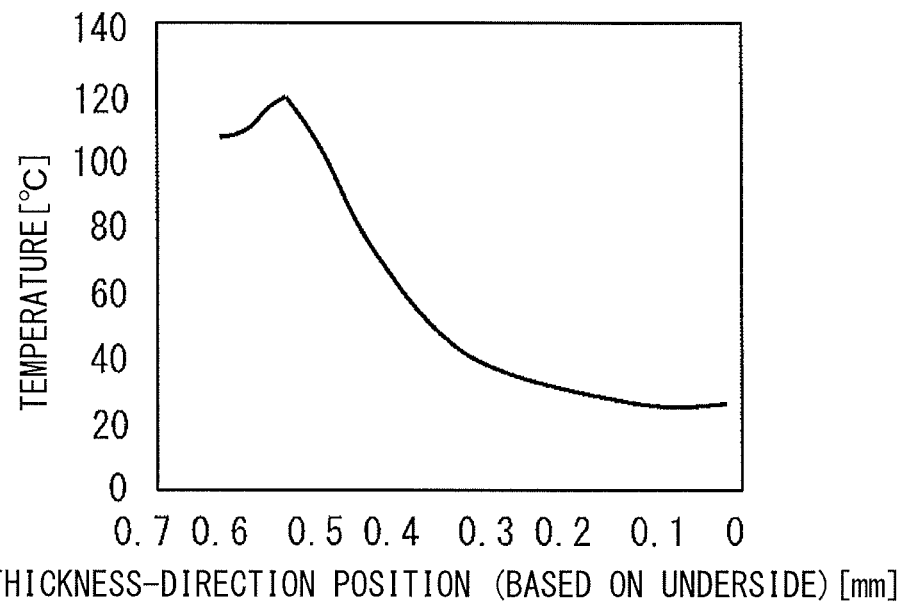
[ FIG. 9 ]
| | LEUCO DYE 10A | LIGHT-HEAT CONVERTING AGENT 10B FOR WRITING | LIGHT-HEAT CONVERTING AGENT 10C FOR ERASING |
|---|---|---|---|
| PROTECTIVE LAYER 15 | — | — | — |
| RECORDING LAYER 13 (13c) | ○ | ○ | — |
| HEAT-INSULATING LAYER 14 (14b) | — | — | — |
| RECORDING LAYER 13 (13b) | ○ | ○ | — |
| HEAT-INSULATING LAYER 14 (14a) | — | — | — |
| RECORDING LAYER 13 (13a) | ○ | ○ | — |
| UNDERLAYER 12 | — | — | ○ |
| BASE MATERIAL 11 | — | — | — |

[ FIG. 10 ]
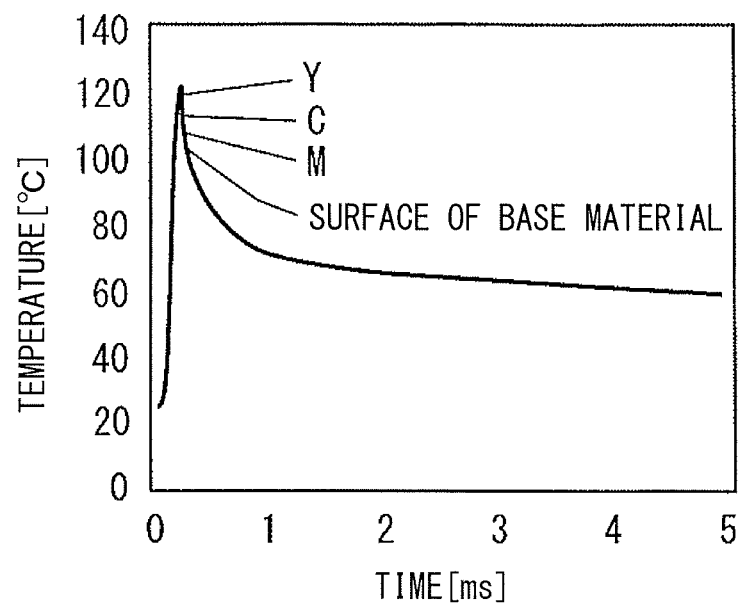
[ FIG. 11 ]
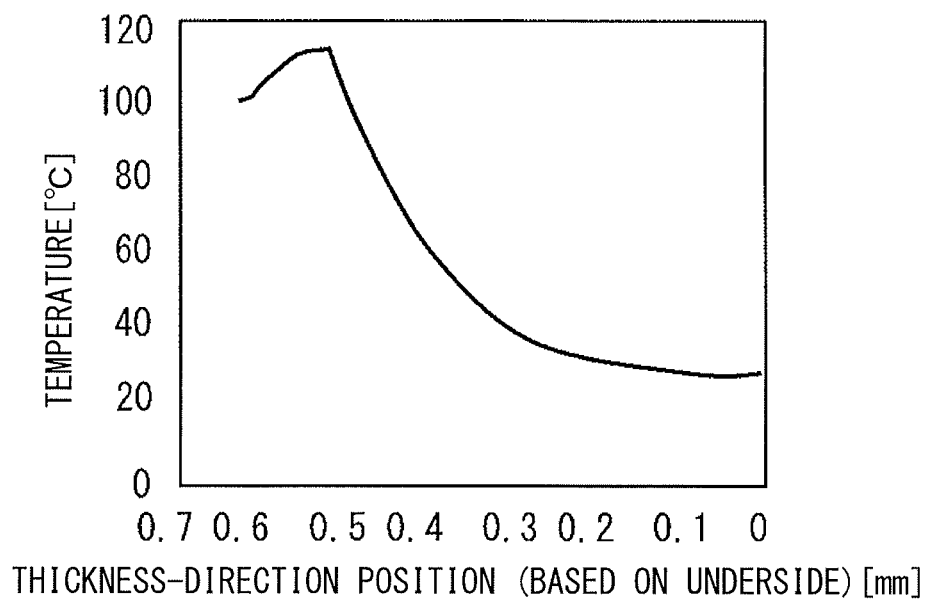

[ FIG. 12 ]

| | LEUCO DYE 10A | LIGHT-HEAT CONVERTING AGENT 10B FOR WRITING | LIGHT-HEAT CONVERTING AGENT 10C FOR ERASING |
|---|---|---|---|
| PROTECTIVE LAYER 15 | — | — | — |
| RECORDING LAYER 13 (13c) | ○ | ○ | — |
| HEAT-INSULATING LAYER 14 (14b) | — | — | — |
| RECORDING LAYER 13 (13b) | ○ | ○ | ○ |
| HEAT-INSULATING LAYER 14 (14a) | — | — | — |
| RECORDING LAYER 13 (13a) | ○ | ○ | — |
| UNDERLAYER 12 | — | — | — |
| BASE MATERIAL 11 | — | — | — |

# REVERSIBLE RECORDING MEDIUM

CROSS REFERENCE TO RELATED APPLICATIONS

The present application is a continuation of U.S. patent application Ser. No. 16/623,904, filed on Dec. 18, 2019, which claims the benefit of International Application No. PCT/JP2018/018348, filed on May 11, 2018, which claims priority to Japanese Patent Application No. 2017-120738 filed on Jun. 20, 2017, the entire contents of which are being incorporated herein by reference.

TECHNICAL FIELD

The present disclosure relates to a reversible recording medium.

BACKGROUND ART

Thermal recording media using a heat-sensitive color developing composition such as leuco dye have been in widespread use. Such recording media include an irreversible recording medium that does not allow for erasing once writing is performed and a reversible recording medium that allows for rewriting any number of times, and they are in practical use now. For example, information is written on a reversible recording medium by a writing device including a light source for writing, and information is erased from the reversible recording medium by an erasing device including a light source for erasing. At this time, the erasing device uses a light source having the same wavelength as a wavelength of the light source for writing (see, for example, PTL 1).

CITATION LIST

Patent Literature

PTL 1: Japanese Unexamined Patent Application Publication No. 2011-104995

SUMMARY OF THE INVENTION

In a case of realizing recording in a full color in a reversible recording medium, it requires, for example, recording layers including color materials that produce three primary colors, one for each primary color. At this time, it is conceivable to provide light sources for erasing, one for each recording layer. However, in such a case, the number of the light sources is increased, thus an erasing process tends to become complicated. Therefore, it is desirable to provide a reversible recording medium that makes it possible to simplify the erasing process.

A first reversible recording medium according to an embodiment of the present disclosure is a reversible recording medium that includes recording layers and heat-insulating layers that are alternately stacked, in which the recording layers each include a reversible heat-sensitive color developing composition and a first light-heat converting agent, the recording layers are different from each other in a developing color of their respective reversible heat-sensitive color developing compositions and are different from each other in an absorption wavelength of their respective first light-heat converting agents. The first reversible recording medium further includes a heat-generating layer that includes a second light-heat converting agent having an absorption wavelength that is different from the absorption wavelength of the first light-heat converting agent included in each of the recording layers.

The first reversible recording medium according to the embodiment of the present disclosure is provided with the heat-generating layer that includes the second light-heat converting agent having the absorption wavelength that is different from the absorption wavelength of the first light-heat converting agent included in each of the recording layers. Accordingly, for example, by irradiating the second light-heat converting agent with laser light having the same wavelength as the absorption wavelength of the second light-heat converting agent, it becomes possible to perform erasing of all the recording layers collectively.

A second reversible recording medium according to an embodiment of the present disclosure is a reversible recording medium that includes recording layers and heat-insulating layers that are alternately stacked, in which the recording layers each include a reversible heat-sensitive color developing composition and a first light-heat converting agent, the recording layers are different from each other in a developing color of their respective reversible heat-sensitive color developing compositions and are different from each other in an absorption wavelength of their respective first light-heat converting agents. In the second reversible recording medium, at least one of the plurality of recording layers or at least one of the plurality of heat-insulating layers includes a second light-heat converting agent having an absorption wavelength that is different from the absorption wavelength of the first light-heat converting agent included in each of the recording layers.

In the second reversible recording medium according to the embodiment of the present disclosure, at least one of the plurality of recording layers or at least one of the plurality of heat-insulating layers includes the second light-heat converting agent having the absorption wavelength that is different from the absorption wavelength of the first light-heat converting agent included in each of the recording layers. Accordingly, for example, by irradiating the second light-heat converting agent with laser light having the same wavelength as the absorption wavelength of the second light-heat converting agent, it becomes possible to perform erasing of all the recording layers collectively.

According to the first and second reversible recording media of the embodiments of the present disclosure, for example, by irradiating the second light-heat converting agent with laser light having the same wavelength as the absorption wavelength of the second light-heat converting agent, it becomes possible to perform erasing of all the recording layers collectively; therefore, it is possible to simplify an erasing process. It is to be noted that the effects of the present disclosure are not necessarily limited to those described here, and may be any of effects described in this specification.

BRIEF DESCRIPTION OF DRAWINGS

FIG. 1 is a diagram illustrating a cross-sectional configuration example of a reversible recording medium according to an embodiment of the present disclosure.

FIG. 2 is a diagram illustrating an example of a configuration of layers included in the reversible recording medium illustrated in FIG. 1.

FIG. 3 is a diagram illustrating an example of respective absorption wavelengths of light-heat converting agents included in the reversible recording medium illustrated in FIG. 1.

FIG. 4 is a diagram illustrating an example of temporal changes in temperature of each layer when the light-heat converting agent in a protective layer is caused to generate heat.

FIG. 5 is a diagram illustrating an example of a temperature distribution within the reversible recording medium in a thickness direction when the light-heat converting agent in the protective layer is caused to generate heat.

FIG. 6 is a diagram illustrating a modification example of the configuration of the layers included in the reversible recording medium illustrated in FIG. 1.

FIG. 7 is a diagram illustrating an example of temporal changes in temperature of each layer when the light-heat converting agent in a heat-insulating layer is caused to generate heat.

FIG. 8 is a diagram illustrating an example of a temperature distribution within the reversible recording medium in the thickness direction when the light-heat converting agent in the heat-insulating layer is caused to generate heat.

FIG. 9 is a diagram illustrating a modification example of the configuration of the layers included in the reversible recording medium illustrated in FIG. 1.

FIG. 10 is a diagram illustrating an example of temporal changes in temperature of each layer when the light-heat converting agent in an underlayer is caused to generate heat.

FIG. 11 is a diagram illustrating an example of a temperature distribution within the reversible recording medium in the thickness direction when the light-heat converting agent in the underlayer is caused to generate heat.

FIG. 12 is a diagram illustrating a modification example of the configuration of the layers included in the reversible recording medium illustrated in FIG. 1.

MODES FOR CARRYING OUT THE INVENTION

In the following, an embodiment of the present disclosure is described in detail with reference to the drawings. The following description is a specific example of the present disclosure, and the present disclosure is not limited to the embodiment described below. It is to be noted that description is given in the following order.
1. Embodiment
2. Modification Examples 1. Embodiment

[Configuration]
A reversible recording medium 10 according to an embodiment of the present disclosure is described. FIG. 1 illustrates a cross-sectional configuration example of the reversible recording medium 10 according to the present embodiment. FIG. 2 illustrates a configuration example of layers included in the reversible recording medium 10. The reversible recording medium 10 has, for example, a structure in which recording layers 13 and heat-insulating layers 14 are alternately stacked on a base material 11.

The reversible recording medium 10 includes, for example, an underlayer 12, three recording layers 13 (13a, 13b, and 13c), two heat-insulating layers 14 (14a and 14b), and a protective layer 15 that are provided on the base material 11. The three recording layers 13 (13a, 13b, and 13c) are disposed in the order of the recording layer 13a, the recording layer 13b, and the recording layer 13c from the side of the base material 11. The two heat-insulating layers 14 (14a and 14b) are disposed in the order of the heat-insulating layer 14a and the heat-insulating layer 14b from the side of the base material 11. The underlayer 12 is formed in contact with the surface of the base material 11. The protective layer 15 is formed on the outermost surface of the reversible recording medium 10.

The base material 11 supports the recording layers 13 and the heat-insulating layers 14. The base material 11 serves as a substrate for layers to be formed on its surface. The base material 11 may be one that allows light to pass therethrough, or may be one that does not allow light to pass therethrough. In a case where the base material 11 is the one that does not allow light to pass therethrough, the surface color of the base material 11 may be, for example, white, or may be a color other than white. The base material 11 includes, for example, ABS resin. The underlayer 12 has a function of improving adhesion of the recording layer 13a and the base material 11. The underlayer 12 includes, for example, a material that allows light to pass therethrough.

The three recording layers 13 (13a, 13b, and 13c) are able to reversibly change their state between a colored state and a decolored state. The three recording layers 13 (13a, 13b, and 13c) are configured to exhibit different colors from one another when they are in a colored state. The three recording layers 13 (13a, 13b, and 13c) each include a leuco dye 10A (a reversible heat-sensitive color developing composition) and a light-heat converting agent 10B (a first light-heat converting agent) that is caused to generate heat upon writing. The three recording layers 13 (13a, 13b, and 13c) each further include a developer and a polymer.

The leuco dye 10A is combined with the developer and put into a colored state when heated, or is separated from the developer and put into a decolored state. A developing color of the leuco dye 10A included in each recording layer 13 differs among the recording layers 13 (13a, 13b, and 13c). The leuco dye 10A included in the recording layer 13a is combined with the developer when heated, thereby developing magenta color. The leuco dye 10A included in the recording layer 13b is combined with the developer when heated, thereby developing cyan color. The leuco dye 10A included in the recording layer 13c is combined with the developer when heated, thereby developing yellow color. The positional relationship among the three recording layers 13 (13a, 13b, and 13c) is not limited to the above-described example. Furthermore, the three recording layers 13 (13a, 13b, and 13c) become transparent when they are in a decolored state. Accordingly, the reversible recording medium 10 allows for recording of an image using a wide gamut of colors.

The light-heat converting agent 10B absorbs light in a near infrared region (700 nm to 2500 nm) and generates heat. The respective light-heat converting agents 10B included in the recording layers 13 (13a, 13b, and 13c) are different in absorption wavelength from one another. FIG. 3 illustrates an example of respective absorption wavelengths of the light-heat converting agents 10B included in the recording layers 13 (13a, 13b, and 13c). The light-heat converting agent 10B included in the recording layer 13c has an absorption peak, for example, at 760 nm as illustrated in part (A) of FIG. 3. The light-heat converting agent 10B included in the recording layer 13b has an absorption peak, for example, at 860 nm as illustrated in part (B) of FIG. 3. The light-heat converting agent 10B included in the recording layer 13a has an absorption peak, for example, at 915 nm as illustrated in part (C) of FIG. 3. The respective absorption peaks of the light-heat converting agents 10B included in the recording layers 13 (13a, 13b, and 13c) are not limited to the above-described examples.

The heat-insulating layer 14a is for making heat transfer between the recording layer 13a and the recording layer 13b difficult. The heat-insulating layer 14b is for making heat transfer between the recording layer 13b and the recording layer 13c difficult. The protective layer 15 is for protecting the surface of the reversible recording medium 10, and serves as an overcoat layer of the reversible recording medium 10. The two heat-insulating layers 14 (14a and 14b) and the protective layer 15 include a transparent material. The reversible recording medium 10 may include, for example, a resin layer having relatively high rigidity (for example, a PEN resin layer) or the like directly underneath the protective layer 15.

In the present embodiment, the protective layer 15 includes a light-heat converting agent 10C (a second light-heat converting agent) that is caused to generate heat upon erasing. As with the light-heat converting agent 10B, the light-heat converting agent 10C absorbs light in the near infrared region (700 nm to 2500 nm) and generates heat. An absorption wavelength of the light-heat converting agent 10C is a wavelength that is higher than the absorption wavelength of the light-heat converting agent B included in each of the recording layers 13. The light-heat converting agent 10C has an absorption peak, for example, at 980 nm as illustrated in part (D) of FIG. 3. The absorption peak of the light-heat converting agent 10C included in the protective layer 15 is not limited to the above-described example. The protective layer 15 does not include a material like the leuco dye 10A that is combined with the developer and put into a colored state when heated. Therefore, the protective layer 15 does not go into a colored state.

[Manufacturing Method]

Subsequently, a specific method of manufacturing some of the layers in the reversible recording medium 10 is described.

A paint containing materials described below was dispersed for two hours by means of a rocking mill. The paint obtained through this was applied with a wire bar, and was heat-dried at 70° C. for five minutes. Thus, the recording layer 13 having a thickness of 3 μm was formed.

A paint for forming the recording layer 13a contains the following materials.

[Chem. 1]
• Leuco dye (2 parts by weight)

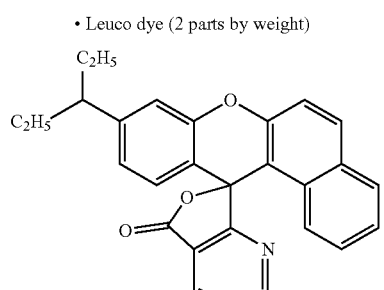

• Color developer/reducer (4 parts by weight)

[Chem. 2]

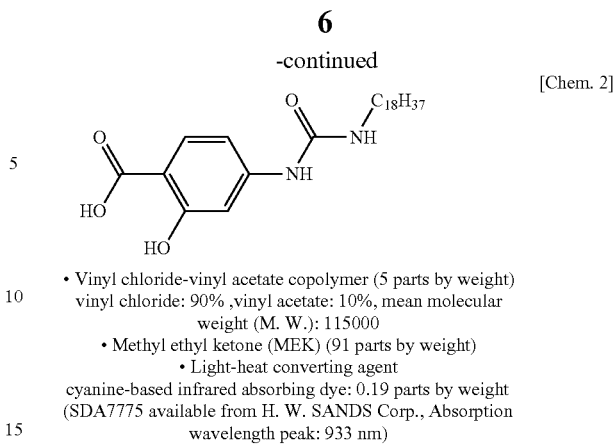

• Vinyl chloride-vinyl acetate copolymer (5 parts by weight)
  vinyl chloride: 90% ,vinyl acetate: 10%, mean molecular
  weight (M. W.): 115000
• Methyl ethyl ketone (MEK) (91 parts by weight)
• Light-heat converting agent
cyanine-based infrared absorbing dye: 0.19 parts by weight
(SDA7775 available from H. W. SANDS Corp., Absorption
wavelength peak: 933 nm)

A paint for forming the recording layer 13b contains the following materials.

[Chem. 3]
• Leuco dye (1.8 parts by weight)

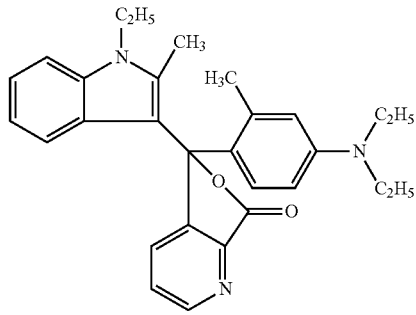

• Color developer/reducer (4 parts by weight)

[Chem. 4]

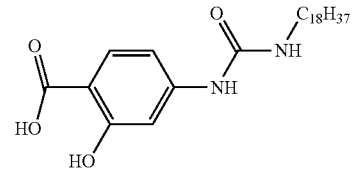

• Vinyl chloride-vinyl acetate copolymer (5 parts by weight) vinyl chloride:
  90%, vinyl acetate: 10%, mean molecular weight (M. W.): 115000
• Methyl ethyl ketone (MEK) (91 parts by weight)
• Light-heat converting agent
cyanin-based infrared absorbing dye: 0.12 parts by weight
(SDA5688 available from H. W. SANDS Corp., Absorption wavelength
peak: 861 nm)

A paint for forming the recording layer 13c contains the following materials.

[Chem. 5]
• Leuco dye 10A (1.3 parts by weight)

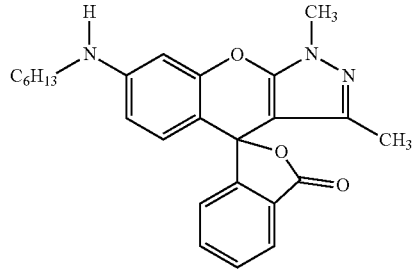

• Color developer/reducer (4 parts by weight)

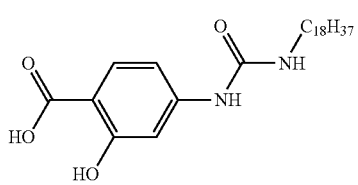

[Chem. 6]

- Vinyl chloride-vinyl acetate copolymer (5 parts by weight) vinyl chloride: 90%, vinyl acetate: 10%, mean molecular weight (M. W.): 115000
- Methyl ethyl ketone (MEK) (91 parts by weight)
- Light-heat converting agent
cyanine-based infrared absorbing dye: 0.10 parts by weight (CY-10 available from Nippon Kayaku Co., Ltd., Absorption wavelength peak: 798 nm)

A polyvinyl alcohol solution was applied and dried. Thus, the heat-insulating layer 14 having a thickness of 20 µm was formed. Furthermore, ultraviolet curable resin containing, for example, a material having a high absorbance at around 1000 nm, such as iminium salt-based dye, diimonium salt-based dye, or aminium salt-based dye, as a light-heat converting agent was applied, and then was irradiated with ultraviolet rays and cured. Thus, the protective layer 15 having a thickness of about 2 µm was formed.

Subsequently, writing and erasing of information on and from the reversible recording medium 10 is described.

[Writing]

First, the reversible recording medium 10 is prepared. Next, for example, merged light obtained by merging laser light having an emission wavelength of 760 nm, laser light having an emission wavelength of 860 nm, and laser light having an emission wavelength of 915 nm together is emitted to the reversible recording medium 10. As a result, the laser light having an emission wavelength of 760 nm is absorbed by the light-heat converting agent 10B in the recording layer 13c, thus the leuco dye 10A in the recording layer 13c is caused to reach its writing temperature by heat generated from the light-heat converting agent 10B, and is combined with the developer and develops yellow color. The yellow-color optical density depends on the intensity of the laser light having an emission wavelength of 760 nm. Furthermore, the laser light having an emission wavelength of 860 nm is absorbed by the light-heat converting agent 10B in the recording layer 13b, thus the leuco dye 10A in the recording layer 13b is caused to reach its writing temperature by heat generated from the light-heat converting agent 10B, and is combined with the developer and develops cyan color. The cyan-color optical density depends on the intensity of the laser light having an emission wavelength of 860 nm. Moreover, the laser light having an emission wavelength of 915 nm is absorbed by the light-heat converting agent 10B in the recording layer 13a, thus the leuco dye 10A in the recording layer 13a is caused to reach its writing temperature by heat generated from the light-heat converting agent 10B, and is combined with the developer and develops magenta color. The magenta-color optical density depends on the intensity of the laser light having an emission wavelength of 915 nm. As a result, a desired color is produced by a mixture of the yellow, cyan, and magenta colors. In this way, writing of information on the reversible recording medium 10 is performed.

[Erasing]

First, the reversible recording medium 10 with information written thereon as described above is prepared. Next, for example, laser light having an emission wavelength of 980 nm is emitted to the reversible recording medium 10. As a result, the laser light having an emission wavelength of 980 nm is absorbed by the light-heat converting agent 10C in the protective layer 15, thus the respective leuco dyes 10A in the recording layers 13 are caused to reach their erasing temperature by heat generated from the light-heat converting agent 10C, and are each separated from the developer and decolored. In this way, erasing of the information from the reversible recording medium 10 is performed.

FIG. 4 illustrates an example of temporal changes in temperature of each layer when the light-heat converting agent 10C in the protective layer 15 is caused to generate heat. FIG. 5 illustrates an example of a temperature distribution within the reversible recording medium 10 in a thickness direction when the light-heat converting agent 10C in the protective layer 15 is caused to generate heat. FIG. 4 illustrates the respective temperatures of the recording layers 13 and the surface temperature of the base material 11. In FIGS. 4 and 5, light emission power is adjusted to cause the respective temperatures of the recording layers 13 to reach the erasing temperature (110° C.) of the recording layers 13. As illustrated in FIGS. 4 and 5, by causing the light-heat converting agent 10C provided in the protective layer 15 to generate heat, it is seen that the respective temperatures of the recording layers 13 are caused to reach the erasing temperature (110° C.) and it is further seen that the temperature of the base material 11 is below 100° C. It can be appreciated therefrom that a material having a heat resisting temperature of 100° C. or higher is able to be used as the base material 11.

[Effects]

Subsequently, effects of the reversible recording medium 10 are described.

In a case of realizing recording in a full color in a reversible recording medium, it requires, for example, recording layers including color materials that produce three primary colors, one for each primary color. At this time, it is conceivable to provide light sources for erasing, one for each recording layer. However, in such a case, the number of the light sources is increased, thus an erasing process tends to become complicated.

Meanwhile, in the present embodiment, the protective layer 15 also serves as a heat-generating layer including the light-heat converting agent 10C having the absorption wavelength that is different from the absorption wavelength of the light-heat converting agent 10B included in each of the recording layers 13. Accordingly, for example, by irradiating the light-heat converting agent 10C with laser light having the same wavelength as the absorption wavelength of the light-heat converting agent 10C, the respective temperatures of the recording layers 13 are caused to reach the erasing temperature of the recording layers 13; therefore, it is possible to perform erasing of all the recording layers 13 collectively. Consequently, there are hardly any complications such as disposition of light sources and condition setting required when a plurality of light sources for erasing is provided, and therefore it is possible to simplify the erasing process.

Furthermore, in the present embodiment, the protective layer 15 farthest from the base material 11 serves as a heat-generating layer for erasing information written on the reversible recording medium 10. Accordingly, even in a case where the heat resistance of the base material 11 is not so high, it is possible to perform erasing of all the recording layers 13 collectively while suppressing deformation of the base material 11.

Moreover, in the present embodiment, the absorption wavelength of the light-heat converting agent 13C is a wavelength that is higher than the absorption wavelength of the light-heat converting agent 10B included in each of the recording layers 13. Accordingly, when information is written on the reversible recording medium 10, it is possible to ensure that the generation of heat of the light-heat converting agent 13C is avoided and an occurrence of unintended writing is avoided accordingly. Consequently, it is possible to prevent the quality of a written image from being impaired by the light-heat converting agent 13C.

2. Modification Examples

Subsequently, some modification examples of the reversible recording medium 10 according to the foregoing embodiment are described.

Modification Example A

FIG. 6 illustrates a configuration example of the layers included in the reversible recording medium 10. In the present modification example, at least one (for example, the heat-insulating layer 14a) of the plurality of heat-insulating layers 14 includes the light-heat converting agent 10C having the absorption wavelength that is different from the absorption wavelength of the light-heat converting agent 10A included in each of the recording layers 13. The absorption wavelength of the light-heat converting agent 10C is a wavelength that is higher than the absorption wavelength of the light-heat converting agent B included in each of the recording layers 13. The heat-insulating layers 14 do not include a material like the leuco dye 10A that is combined with the developer and put into a colored state when heated. Therefore, the heat-insulating layers 14 do not go into a colored state when heated.

FIG. 7 illustrates an example of temporal changes in temperature of each layer when the light-heat converting agent 10C in the heat-insulating layer 14a is caused to generate heat. FIG. 8 illustrates an example of a temperature distribution within the reversible recording medium 10 in the thickness direction when the light-heat converting agent 10C in the heat-insulating layer 14a is caused to generate heat. FIG. 7 illustrates the respective temperatures of the recording layers 13 and the surface temperature of the base material 11. In FIGS. 7 and 8, light emission power is adjusted to cause the respective temperatures of the recording layers 13 to reach the erasing temperature of the recording layers 13. As illustrated in FIGS. 7 and 8, by causing the light-heat converting agent 10C provided in the protective layer 15 to generate heat, it is seen that the respective temperatures of the recording layers 13 are caused to reach the erasing temperature, and it is further seen that the temperature of the base material 11 is below 100° C. It can be appreciated therefrom that a material having a heat resisting temperature of 100° C. or higher is able to be used as the base material 11.

In the present modification example, at least one (for example, the heat-insulating layer 14a) of the plurality of heat-insulating layers 14 also serves as a heat-generating layer including the light-heat converting agent 10C having the absorption wavelength that is different from the absorption wavelength of the light-heat converting agent 10B included in each of the recording layers 13. Accordingly, for example, by irradiating the light-heat converting agent 10C with laser light having the same wavelength as the absorption wavelength of the light-heat converting agent 10C, the respective temperatures of the recording layers 13 are caused to reach the erasing temperature of the recording layers 13; therefore, it is possible to perform erasing of all the recording layers 13 collectively. Consequently, there are hardly any complications such as disposition of light sources and condition setting required when a plurality of light sources for erasing is provided, and therefore it is possible to simplify the erasing process.

Furthermore, in the present modification example, one or more of the heat-insulating layers 14 relatively far from the base material 11 serve as a heat-generating layer for erasing information written on the reversible recording medium 10. Accordingly, even in a case where the heat resistance of the base material 11 is not so high, it is possible to perform erasing of all the recording layers 13 collectively while preventing deformation of the base material 11.

Moreover, in the present modification example, the absorption wavelength of the light-heat converting agent 13C is a wavelength that is higher than the absorption wavelength of the light-heat converting agent 10B included in each of the recording layers 13. Accordingly, when information is written on the reversible recording medium 10, it is possible to ensure that the generation of heat of the light-heat converting agent 13C is avoided and an occurrence of unintended writing is avoided accordingly. Consequently, it is possible to prevent the quality of a written image from being impaired by the light-heat converting agent 13C.

Modification Example B

FIG. 9 illustrates a configuration example of the layers included in the reversible recording medium 10. In the present modification example, the underlayer 12 includes the light-heat converting agent 10C having the absorption wavelength that is different from the absorption wavelength of the light-heat converting agent 10A included in each of the recording layers 13. The absorption wavelength of the light-heat converting agent 10C is a wavelength that is higher than the absorption wavelength of the light-heat converting agent B included in each of the recording layers 13. The underlayer 12 does not include a material like the leuco dye 10A that is combined with the developer and put into a colored state when heated. Therefore, the underlayer 12 does not go into a colored state when heated.

FIG. 10 illustrates an example of temporal changes in temperature of each layer when the light-heat converting agent 10C in the underlayer 12 is caused to generate heat. FIG. 11 illustrates an example of a temperature distribution within the reversible recording medium 10 in the thickness direction when the light-heat converting agent 10C in the underlayer 12 is caused to generate heat. FIG. 10 illustrates the respective temperatures of the recording layers 13 and the surface temperature of the base material 11. In FIGS. 10 and 11, light emission power is adjusted to cause the respective temperatures of the recording layers 13 to reach the erasing temperature of the recording layers 13. As illustrated in FIGS. 10 and 11, by causing the light-heat converting agent 10C provided in the underlayer 12 to generate heat, it is seen that the respective temperatures of the recording layers 13 are caused to reach the erasing temperature, and it is further seen that the temperature of the base material 11 is below 105° C. It can be appreciated therefrom that a material having a heat resisting temperature of 105° C. or higher is able to be used as the base material 11.

In the present modification example, the underlayer 12 also serves as a heat-generating layer including the light-heat converting agent 10C having the absorption wavelength that is different from the absorption wavelength of the light-heat converting agent 10B included in each of the recording layers 13. Accordingly, for example, by irradiating the light-heat converting agent 10C with laser light having the same wavelength as the absorption wavelength of the light-heat converting agent 10C, the respective temperatures of the recording layers 13 are caused to reach the erasing temperature of the recording layers 13; therefore, it is possible to perform erasing of all the recording layers 13 collectively. Consequently, there are hardly any complications such as disposition of light sources and condition setting required when a plurality of light sources for erasing is provided, and therefore it is possible to simplify the erasing process.

Furthermore, in the present modification example, the underlayer 12 relatively close to the base material 11 serves as a heat-generating layer for erasing information written on the reversible recording medium 10. Even in such a case, by selecting one having slightly high heat resistance as the base material 11, it becomes possible to perform erasing of all the recording layers 13 collectively while preventing deformation of the base material 11.

Moreover, in the present modification example, the absorption wavelength of the light-heat converting agent 13C is a wavelength that is higher than the absorption wavelength of the light-heat converting agent 10B included in each of the recording layers 13. Accordingly, when information is written on the reversible recording medium 10, it is possible to ensure that the generation of heat of the light-heat converting agent 13C is avoided and an occurrence of unintended writing is avoided accordingly. Consequently, it is possible to prevent the quality of a written image from being impaired by the light-heat converting agent 13C.

Modification Example C

FIG. 12 illustrates a configuration example of the layers included in the reversible recording medium 10. In the present modification example, at least one (for example, the recording layer 13b) of the plurality of recording layers 13 includes the light-heat converting agent 10C having the absorption wavelength that is different from the absorption wavelength of the light-heat converting agent 10A included in each of the recording layers 13. The absorption wavelength of the light-heat converting agent 10C is a wavelength that is higher than the absorption wavelength of the light-heat converting agent B included in each of the recording layers 13. The recording layers 13 each include the leuco dye 10A. Therefore, the recording layers 13 go into a colored state depending on the magnitude of heat.

In the present modification example, at least one (for example, the recording layer 13b) of the plurality of recording layers 13 also serves as a heat-generating layer including the light-heat converting agent 10C having the absorption wavelength that is different from the absorption wavelength of the light-heat converting agent 10B included in each of the recording layers 13. Accordingly, for example, by irradiating the light-heat converting agent 10C with laser light having the same wavelength as the absorption wavelength of the light-heat converting agent 10C, the respective temperatures of the recording layers 13 are caused to reach the erasing temperature of the recording layers 13; therefore, it is possible to perform erasing of all the recording layers 13 collectively. Consequently, there are hardly any complications such as disposition of light sources and condition setting required when a plurality of light sources for erasing is provided, and therefore it is possible to simplify the erasing process.

Furthermore, in the present modification example, the recording layer 13 relatively far from the base material 11 (for example, the recording layer 13b or the recording layer 13c) serves as a heat-generating layer for erasing information written on the reversible recording medium 10. Accordingly, even in a case where the heat resistance of the base material 11 is not so high, it is possible to perform erasing of all the recording layers 13 collectively while preventing deformation of the base material 11.

It is to be noted that in a case where the recording layer 13a relatively close to the base material 11 serves as a heat-generating layer for erasing information written on the reversible recording medium 10, by selecting one having slightly high heat resistance as the base material 11, it becomes possible to decolor all the recording layers 13 collectively while preventing deformation of the base material 11.

Moreover, in the present embodiment, the absorption wavelength of the light-heat converting agent 13C is a wavelength that is higher than the absorption wavelength of the light-heat converting agent 10B included in each of the recording layers 13. Accordingly, when information is written on the reversible recording medium 10, it is possible to ensure that the generation of heat of the light-heat converting agent 13C is avoided and an occurrence of unintended writing is avoided accordingly. Consequently, it is possible to prevent the quality of a written image from being impaired by the light-heat converting agent 13C.

As above, the present disclosure has been described with reference to the embodiment and its modification examples; however, the present disclosure is not limited to the above-described embodiment, etc., and may be modified in a variety of ways. It is to be noted that the effects described in this specification are merely exemplary. The effects of the present disclosure are not limited to the effects described in this specification. The present disclosure may have effects other than those described in this specification.

Furthermore, for example, the present disclosure may have the following configurations.

(1)

A reversible recording medium, including recording layers and heat-insulating layers that are alternately stacked, the recording layers each including a reversible heat-sensitive color developing composition and a first light-heat converting agent, the recording layers being different from each other in a developing color of their respective reversible heat-sensitive color developing compositions and being different from each other in an absorption wavelength of their respective first light-heat converting agents, the reversible recording medium further including a heat-generating layer that includes a second light-heat converting agent having an absorption wavelength that is different from the absorption wavelength of the first light-heat converting agent included in each of the recording layers.

(2)

The reversible recording medium according to (1), in which the heat-generating layer serves as an overcoat layer of the reversible recording medium.

(3)

The reversible recording medium according to (1), further including: a base material that supports the recording layers and the heat-insulating layers; and an underlayer that is in contact with a surface of the base material, in which the heat-generating layer serves as the underlayer.

(4)

The reversible recording medium according to any one of (1) to (3), in which the absorption wavelength of the second light-heat converting agent is a wavelength that is higher than the absorption wavelength of the first light-heat converting agent included in each of the recording layers.

(5)

A reversible recording medium, including recording layers and heat-insulating layers that are alternately stacked, the recording layers each including a reversible heat-sensitive color developing composition and a first light-heat converting agent, the recording layers being different from each other in a developing color of their respective reversible heat-sensitive color developing compositions and being different from each other in an absorption wavelength of their respective first light-heat converting agents, at least one of the plurality of recording layers or at least one of the plurality of heat-insulating layers including a second light-heat converting agent having an absorption wavelength that is different from the absorption wavelength of the first light-heat converting agent included in each of the recording layers.

(6)

The reversible recording medium according to (5), in which the absorption wavelength of the second light-heat converting agent is a wavelength that is higher than the absorption wavelength of the first light-heat converting agent included in each of the recording layers.

This application claims the benefit of Japanese Priority Patent Application JP2017-120738 filed with the Japan Patent Office on Jun. 20, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A reversible recording medium, comprising recording layers and heat-insulating layers that are alternately stacked on a base material,
   the recording layers each including a reversible heat-sensitive color developing composition and a first light-heat converting agent,
   the recording layers being different from each other in a developing color of their respective reversible heat-sensitive color developing compositions and being different from each other in an absorption wavelength of their respective first light-heat converting agents,
   wherein at least one of the plurality recording layers including a second light-heat converting agent having an absorption wavelength that is different from the absorption wavelength of the first light-heat converting agent included in each of the recording layers.

2. The reversible recording medium according to claim 1, further comprising an underlayer that is in contact with a surface of on the base material.

3. The reversible recording medium according to claim 1, further comprising a protective layer on outermost surface of the reversible recording medium.

4. The reversible recording medium according to claim 1, further comprising a protective layer on a surface of on the base material.

5. The reversible recording medium according to claim 1, wherein the absorption wavelength of the second light-heat converting agent is a wavelength that is higher than the absorption wavelength of the first light-heat converting agent included in each of the recording layers.

6. A reversible recording medium, comprising recording layers and heat-insulating layers that are alternately stacked on a base material,
   the recording layers each including a reversible heat-sensitive color developing composition and a first light-heat converting agent,
   the recording layers being different from each other in a developing color of their respective reversible heat-sensitive color developing compositions and being different from each other in an absorption wavelength of their respective first light-heat converting agents,
   wherein at least one layer in contact with at least one of the plurality recording layers including a second light-heat converting agent having an absorption wavelength that is different from the absorption wavelength of the first light-heat converting agent included in each of the recording layers.

7. The reversible recording medium according to claim 6, further comprising an underlayer that is in contact with a surface of on the base material.

8. The reversible recording medium according to claim 6, further comprising a protective layer on outermost surface of the reversible recording medium.

9. The reversible recording medium according to claim 6, further comprising a protective layer on a surface of on the base material.

10. The reversible recording medium according to claim 6, wherein the absorption wavelength of the second light-heat converting agent is a wavelength that is higher than the absorption wavelength of the first light-heat converting agent included in each of the recording layers.

* * * * *